US012726665B1

(12) United States Patent
Chen

(10) Patent No.: US 12,726,665 B1
(45) Date of Patent: Sep. 1, 2026

(54) METHODS AND SYSTEMS FOR PROVIDING A HYBRID BITRATE STREAM OF DIGITAL CONTENT

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/091,248

(22) Filed: Mar. 26, 2025

(51) Int. Cl.
*H04N 21/24* (2011.01)
*H04N 21/2343* (2011.01)

(52) U.S. Cl.
CPC ..... *H04N 21/2402* (2013.01); *H04N 21/2343* (2013.01)

(58) Field of Classification Search
CPC ....................... H04N 21/2402; H04N 21/2343
See application file for complete search history.

(56) References Cited

U.S. PATENT DOCUMENTS 5,978,035 A 11/1999 Geshwind
6,480,541 B1 11/2002 Girod et al.
6,631,240 B1 10/2003 Salesin et al.
7,463,683 B2 12/2008 Van Der Schaar et al.
7,817,576 B1 10/2010 Breau et al.
8,184,712 B2 5/2012 Mukherjee
8,681,871 B2 3/2014 Vilei et al.
8,989,519 B2 3/2015 Irani et al.
10,157,447 B2 12/2018 Bar-On et al.
10,869,087 B2 12/2020 Syed
10,887,612 B2 1/2021 Rossato et al.
2001/0033295 A1 10/2001 Phillips
2001/0043751 A1 11/2001 Takahashi et al.

(Continued)

FOREIGN PATENT DOCUMENTS

EP 1631089 A1 3/2006
EP 1721465 A1 11/2006

(Continued)

OTHER PUBLICATIONS

"Streaming learning center", retrieved at https://streaminglearningcenter.com/encoding/everything-you-ever-wanted-to-knowabout-idr-frames-but-were-afraid-to-ask.html, retrieved on Jun. 5, 2025, 3 pages.

(Continued)

*Primary Examiner* — Anthony Bantamoi
(74) *Attorney, Agent, or Firm* — HG LAW LLP

(57) ABSTRACT

Systems and methods are described for providing hybrid streams of digital content. Device network parameters, comprising a bitrate capacity, are determined, for receiving a hybrid stream of digital content. A first stream of the digital content is selected based on the network parameters, each stream stored at a storage and associated with corresponding encoding parameters indicative of a bitrate. A bitrate differential is determined between the bitrate capacity and a first bitrate of the first stream. First encoded video frames of the first stream and second encoded video frames of a second stream are determined based on the bitrate differential, the second stream encoding parameters indicative of a second bitrate higher than the first bitrate. The hybrid stream is constructed to comprise the first encoded video frames and the second encoded video frames. The hybrid stream is provided for presentation of the digital content at the device.

19 Claims, 8 Drawing Sheets

(56) References Cited

U.S. PATENT DOCUMENTS

| | | | |
|---|---|---|---|
| 2002/0191116 | A1 | 12/2002 | Kessler et al. |
| 2004/0213345 | A1 | 10/2004 | Holcomb et al. |
| 2005/0165911 | A1 | 7/2005 | Homiller |
| 2005/0169386 | A1 | 8/2005 | Spalink et al. |
| 2005/0195899 | A1 | 9/2005 | Han |
| 2005/0195900 | A1 | 9/2005 | Han |
| 2006/0083315 | A1 | 4/2006 | Sato et al. |
| 2006/0127059 | A1 | 6/2006 | Fanning |
| 2006/0146931 | A1 | 7/2006 | Boyce |
| 2007/0081794 | A1 | 4/2007 | Baynger et al. |
| 2007/0086519 | A1 | 4/2007 | Lim |
| 2007/0147804 | A1 | 6/2007 | Zhang et al. |
| 2007/0195878 | A1 | 8/2007 | Bruls et al. |
| 2010/0098152 | A1 | 4/2010 | Glenn |
| 2010/0142836 | A1 | 6/2010 | Joshi et al. |
| 2012/0128262 | A1 | 5/2012 | Eppolito |
| 2012/0297082 | A1 | 11/2012 | Sim |
| 2013/0051767 | A1 | 2/2013 | Soroushian et al. |
| 2013/0322517 | A1 | 12/2013 | Zurpal et al. |
| 2014/0140407 | A1 | 5/2014 | Yu et al. |
| 2014/0328569 | A1 | 11/2014 | Strobl et al. |
| 2015/0036736 | A1 | 2/2015 | Lundberg |
| 2015/0124165 | A1 | 5/2015 | Mendenhall et al. |
| 2015/0195485 | A1 | 7/2015 | Wan et al. |
| 2015/0324952 | A1 | 11/2015 | Namboodiri et al. |
| 2016/0100128 | A1 | 4/2016 | Butterworth et al. |
| 2020/0169766 | A1* | 5/2020 | Chirokov ........... H04N 21/2365 |
| 2022/0385911 | A1 | 12/2022 | Ferrara et al. |
| 2023/0179781 | A1 | 6/2023 | Kelly |

FOREIGN PATENT DOCUMENTS

| | | | |
|---|---|---|---|
| EP | 1787473 | A1 | 5/2007 |
| EP | 3151563 | A1 | 4/2017 |
| EP | 4362465 | A1 | 5/2024 |
| WO | 2007/003340 | A2 | 1/2007 |
| WO | 2007/020278 | A2 | 2/2007 |
| WO | 2013/017565 | A1 | 2/2013 |
| WO | 2024/201025 | A1 | 10/2024 |

OTHER PUBLICATIONS

Ancuti, C., et al., "Video super-resolution using high quality photographs", 2010 IEEE International Conference on Acoustics, Speech and Signal Processing, 2010, pp. 862-865.

Cao, J., et al., "Reference-Based Image Super-Resolution with Deformable Attention Transformer", Computer Vision—ECCV 2022, Nov. 3, 2022, pp. 325-342.

Chen T., U.S. Appl. No. 18/660,747, filed May 10, 2024. Title: Methods and System for Progressive Streaming of Video Segments . . . (Not provided; USPTO in possession of specification, claims and prosecution history).

Chris: "Frame Types, The I, P & B's of video encoding", Flaeri's tech talk, retrieved at https://blog.otterbro.com/frame-types-framing-the-whole-picture/, retrieved on Nov. 8, 2020, 5 pages.

Freedman, G., et al., "Image and video upscaling from local self-examples", ACM Transactions on Graphics (TOG), vol. 30, No. 2, Article No. 12, Apr. 22, 2011, pp. 1-11.

Hu, Y., et al., "Standard Compliant Video Coding Using Low Complexity, Switchable Neural Wrappers", 2024 IEEE International Conference on Image Processing (ICIP), contentarXiv: 2407.07395v1 [cs.CV], Jul. 10, 2024, 26 pages.

Ioannis Katsavounidis, "Dynamic optimizer—a perceptual video encoding optimization framework", Netflix TechBlog, Mar. 5, 2018, 24 pages.

ireplay.tv :"Video Streaming Definitions", retrieved at https://ireplay.tv/video-streaming-definitions/what-is-an-idr-instantaneous-decoderrefresh/, retrieved on Jun. 5, 2025, 12 pages.

Per-Title Encode Optimization, "Per-Title Encode Optimization", retrieved from <https://netflixtechblog.com/per-title-encode-optimization-7e99442b62a2>, Dec. 14, 2015, 17 pages.

Rhee, H., et al., "Lightweight Hybrid Video Compression Framework Using Reference-Guided Restoration Network", arXiv:2303.11592, Mar. 21, 2023, 11 pages.

Sun, W., et al., "Attention-guided video super-resolution with recurrent multi-scale spatial-temporal transformer", Complex & Intelligent Systems, vol. 9, 2023, pp. 3989-4002.

Yang, R., et al., "Decoder-side HEVC quality enhancement with scalable convolutional neural network", 2017 IEEE International Conference on Multimedia and Expo (ICME), Jul. 10-14, 2017, pp. 817-822.

Zhang, X., et al., "Real-world video superresolution enhancement method based on the adaptive down-sampling model", Nature, Scientific Reports, vol. 14, No. 1, Sep. 4, 2024, 16 pages.

Zhou, X., et al., "Video Super-Resolution Transformer with Masked Inter&Intra-Frame Attention", IEEE/CVF Conference on Computer Vision and Pattern Recognition (CVPR), 2024, pp. 25399-25408.

* cited by examiner

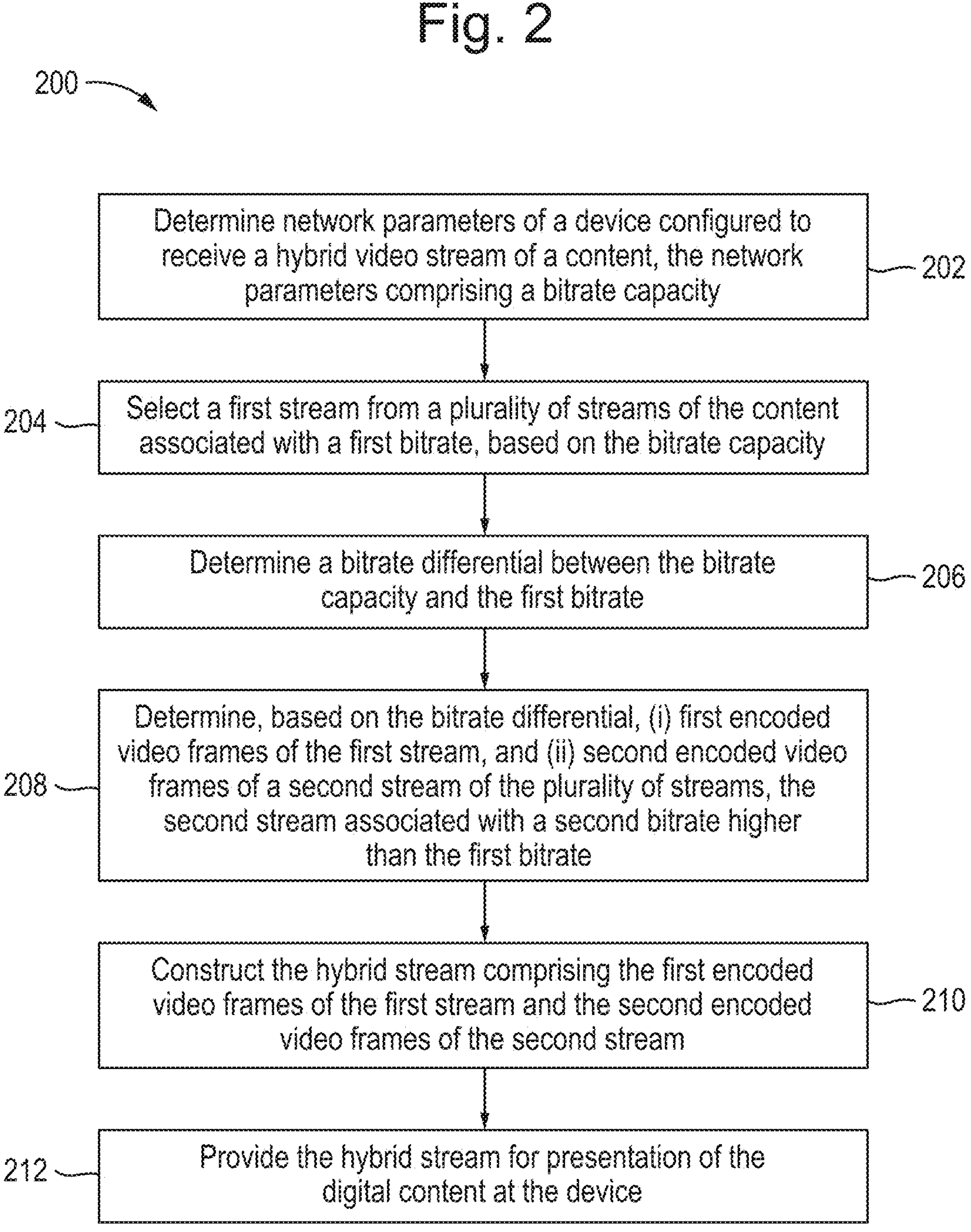
Fig. 2
200
Determine network parameters of a device configured to receive a hybrid video stream of a content, the network parameters comprising a bitrate capacity
202
204
Select a first stream from a plurality of streams of the content associated with a first bitrate, based on the bitrate capacity
Determine a bitrate differential between the bitrate capacity and the first bitrate
206
208
Determine, based on the bitrate differential, (i) first encoded video frames of the first stream, and (ii) second encoded video frames of a second stream of the plurality of streams, the second stream associated with a second bitrate higher than the first bitrate
Construct the hybrid stream comprising the first encoded video frames of the first stream and the second encoded video frames of the second stream
210
212
Provide the hybrid stream for presentation of the digital content at the device Bitrate Ladder 400

| | Resolution | | | Bitrate |
|---|---|---|---|---|
| 402 | 3840 x 2160 | 4k | | 15 Mbps |
| 404 | 1920 x 1080 | 1080p | | 7.5 Mbps |
| 406 | 1280 x 720 | 720p | | 4 Mbps |
| 408 | 720 x 480 | 480p | | 2.5 Mbps |
| 410 | 540 x 360 | 360p | | 1.5 Mbps |
| 412 | 360 x 240 | 240p | | 1 Mbps |

Bitrate Ladder 520

| Resolution | | | Bitrate |
|---|---|---|---|
| 3840 x 2160 | 4k | | 15 Mbps |
| 1920 x 1080 | 1080p | | 7.5 Mbps |
| Hybrid | Hybrid | | 5.5 Mbps |
| 1280 x 720 | 720p | | 4 Mbps |
| 720 x 480 | 480p | | 2.5 Mbps |
| 540 x 360 | 360p | | 1.5 Mbps |
| 360 x 240 | 240p | | 1 Mbps |

Fig. 8

METHODS AND SYSTEMS FOR PROVIDING A HYBRID BITRATE STREAM OF DIGITAL CONTENT

BACKGROUND

The present disclosure relates to methods and systems for providing a hybrid stream of digital content based on a current network capacity (e.g., bandwidth capacity). More particularly, but not exclusively, the present disclosure relates to, based on a bitrate differential between a network capacity and a selected content stream, identifying video frames of a higher bitrate version of the content for streaming alongside the selected content stream.

SUMMARY

Video encoding is a fundamental process in digital media that enables the efficient storage and transmission of video content. Modern video compression techniques exploit both spatial and temporal redundancies within a sequence of video frames to reduce the amount of data required to represent a video stream. This is achieved using various encoding techniques such as transform coding, motion estimation, and entropy coding, which collectively allow for significant data reduction while preserving perceptual video quality.

Video compression, however, inherently involves a trade-off between bitrate and quality. Higher compression levels result in content requiring lower bitrates, reducing storage requirements and bandwidth consumption, but at the cost of introducing compression artefacts such as blurring, blocking, and loss of fine detail. Conversely, maintaining high visual quality with a lower compression level results in content necessitating higher bitrates, which increases data transmission requirements and can lead to buffering or playback interruptions, particularly in bandwidth-constrained environments such as mobile networks.

In the context of video streaming, adaptive bitrate (ABR) streaming techniques have been developed to dynamically adjust the quality of streamed video based on network conditions. ABR algorithms typically select from a set of predefined bitrate-quality levels based on available bandwidth, device capabilities, and buffering considerations. While ABR approaches help to mitigate playback disruptions and improve the user experience, they can often operate within relatively rigid constraints. ABR selection strategies are often designed around fixed bitrate choices, which may not fully optimize video quality for a given network condition. In particular, ABR mechanisms primarily consider bitrate as a proxy for quality, which may lead to suboptimal trade-offs, such as selecting a higher-bitrate stream even when it offers only marginal perceptual improvement or failing to leverage encoding optimizations that could enhance quality without increasing bandwidth consumption.

To address the limitations of higher compression levels and resultant lower bitrate streams, various visual enhancement processes, such as upscaling and post-processing techniques, have been developed to improve the perceived quality of compressed video. These methods can use interpolation, deep learning-based super-resolution, and other enhancement algorithms to generate higher-resolution frames from lower-bitrate inputs. Such enhancement techniques are, however, inherently constrained by the quality of the underlying compressed video. If the lower-bitrate stream contains significant compression artefacts or lacks fine details, upscaling can only provide a limited improvement in visual quality metrics, often leading to unnatural textures or amplified artefacts. These processes, moreover, can introduce additional computational overhead, which may not be suitable for all streaming devices or real-time playback scenarios.

Accordingly, there remains a need for improved techniques that provide more flexible and intelligent video encoding and streaming strategies. Such techniques could enable more efficient use of network resources while maintaining or improving perceived video quality beyond the constraints of conventional ABR-based approaches.

Systems and methods are described for determining whether a surplus of network capacity, such as network bandwidth capacity, is available following the selection of a first stream of a digital content for a device, and based on the surplus, identifying video frames of a higher quality second stream of the digital content for communicating alongside at least a portion of the selected first stream of the digital content, as a hybrid stream, within the constraints of the surplus of signal bandwidth or network capacity. In some examples, a digital content may be selected for streaming at a device and, following the selection, an available signal bandwidth or network capacity for streaming to the device may be determined such that an available first stream of the digital content may be selected for streaming. In the event that a surplus of signal bandwidth or network capacity exists between that required for first stream and that of the device, a selection of one or more video frames from a second higher quality stream of the digital content may be made for streaming with at least a part of the first stream to the device, for decoding for display as part of the first stream, as a hybrid stream. One or more video frames from the first stream may be selected for supplementing or replacing with the selected one or more video frames of the second stream, within the hybrid stream. In some examples, a manifest file associated with the digital content may be created or modified to include an entry for the hybrid stream, for example based on a determined, estimated or predicted surplus of signal bandwidth or network capacity of the device. In some examples, the present systems and methods aim to make use of video frames from existing bitstreams, such as in an ABR ladder. In such a way, the present systems and method may provide an increased granularity of bitrate and stream quality allowing more flexible and gradually variable streaming options, without generating new encodes or metadata. Some examples of the present systems and methods may be applicable to any existing bitstreams or ABR ladders wherein an encoding parameter granularity (such as of a bitrate-resolution pairing) is limited. The present systems and methods may, in some examples provide, for each gradation of encoding parameters used, a dynamic combination of bitstreams, which can in some examples be configured to vary on a segment-by-segment basis, such as in accordance with fluctuating network conditions.

According to systems and methods described herein, one or more network parameters, such as of a device configured to receive a hybrid stream of video frames of a digital content, are determined, the one or more network parameters comprising a network or channel capacity, such as a bitrate capacity. The term "network parameters" will be understood to mean any suitable measurable characteristics or constraints that may define or influence a communication between devices, for example between server and client devices, on a network. The network parameters may comprise, may indicate, or may be used to determine, the network or channel capacity between devices including the device configured to receive the hybrid stream, which may include a bitrate capacity. Such parameters may determine the upper bounds of data transmission, processing, and sustainability within the channel or network and may include, but are not limited to: a bitrate capacity, the maximum data rate in bits per second; a spectral bandwidth, the available frequency range for transmission; latency, the time delay in data transmission; packet loss rate, the proportion of lost or dropped packets; throughput, the actual rate of successfully transmitted data; concurrent connection limits, the number of simultaneous data flows the network can handle; signal-to-noise ratio (SNR); and interference. The network parameters may collectively define the operational limits and performance characteristics of a link between two devices, including the device configured to receive the hybrid bitrate stream, on the network under varying conditions.

In some examples, a first stream is selected from a plurality of streams of the digital content. Each stream of the plurality of streams may be stored at a memory or storage, for example any suitable memory or storage of one or more server devices. The terms "memory" and "storage" as used herein will be understood to mean any suitable short-term or long-term memory, storage or computer-readable media. Each stream of the plurality of streams may be associated with a corresponding one or more encoding parameters used to encode the video frames, the one or more encoding parameters indicative of a network load metric, such as a bitrate. The term "network load metric" will be understood as referring to, or being determinable from, the one or more encoding parameters of the encoded video frames of a stream, the network load metric characterizing the relationship between the one or more encoding parameters used for encoding the video frames and the resulting network or channel capacity load when the stream is transmitted over a network, for example to the device configured to receive the hybrid stream. The network load metric may be understood as providing a measure of how an encoding decision for the encoded video frames of the stream, such as a bitrate, a frame rate, a resolution, a compression level, or a group of pictures structure (such as a keyframe interval), may impact the required transmission capacity of a communication channel on the network.

In some examples, a network load differential, such as a bitrate differential, may be determined between the network or channel capacity (such as the bitrate capacity) and a first network load metric (such as a first bitrate) of the first stream stored to the memory or storage. Therefore, it may be determined when a surplus network or channel capacity exists, such as a surplus bitrate capacity, represented by the network load differential (e.g., bitrate differential). Such a surplus or differential may then be occupied with additional stream data, which may be used to enhance the quality of the selected first stream, within the constraints of the network or channel capacity.

In some examples, each one of (i) a first one or more encoded video frames of the first stream stored to the memory or storage; and (ii) a second one or more encoded video frames of a second stream of the plurality of streams stored to a memory or storage may be determined, based on the network load differential, such as the bitrate differential. The second stream is associated with one or more encoding parameters indicative of a second network load metric, such as a second bitrate, higher than the first network load metric, such as the first bitrate. The determining of the first one or more encoded video frames and the second one or more encoded video frames may be performed in any suitable manner such as described herein, within the constraints of the network load differential.

Therefore, the surplus or differential may be used to determine additional stream content from the second stream, of a higher network load metric (such as bitrate) than the first stream, which may occupy the surplus channel capacity, such as the surplus bitrate capacity. In some examples the network load differential, such as the bitrate differential, may be used to identify suitable encoded video frames of the second stream to supplement or replace corresponding encoded video frames of the selected first stream, such that when provided as a hybrid stream, the second one or more encoded video frames result in an improved quality over the selected first stream, within the constraints of the network or channel capacity.

In some examples, determining the first one or more encoded video frames of the first stream may comprise determining a number of encoded video frames of the first stream which is less than the total number of encoded video frames of the first stream. For example, one or more frames, such as frames determined to have little impact on the quality of the first stream (for example one or more B frames) may be removed. In some examples, a reduced number of video frames of the first stream may be determined so as to reduce or mitigate the network load effect of the determined second one or more encoded video frames of the second stream. In some examples, only a portion of the first stream may be determined. The portion of the first stream may in some examples be used in combination with the determined second encoded one or more video frames to provide a full complement of video frames of a hybrid stream. The combination of the first and second one or more encoded video frames may be determined based on, and within the constraints of, the network load differential and/or the network capacity or channel capacity, as well as the encoding or decoding picture structures in those streams. As used herein, the term "first stream" and "second stream" will be understood to mean any portion of the corresponding first and second stream, and may in some examples be used to refer to the whole stream, or may in some examples be used to refer to one or more corresponding sub-stream components, for example stream segments of the corresponding first or second stream.

In some examples, the hybrid stream may be constructed comprising the determined first one or more encoded video frames of the first stream and the determined second one or more encoded video frames of the second stream. The term "constructing the hybrid stream" will be understood as referring to any suitable step, or steps, in a process of preparing an encoded video stream, such as for transmission, wherein the construction may involve one or more distinct steps in an encoding and delivery pipeline. The constructing of the hybrid stream may therefore, in some examples, comprise one or more selected from: encoding one or more of the first and second one or more video frames according to a defined compression scheme; defining video frame placement or positioning rules to structure intra-coded and inter-coded frames of the first and second one or more frames within a sequence of video frames of the hybrid stream; determining, selecting or defining one or more transmission sequence rules, for example to determine an order in which the first or second one or more video frames of the hybrid stream, or associated packets, are communicated; segmenting or formatting video frame data of the first and second one or more encoded video frames into a communication-ready structure suitable for streaming protocols, such as adaptive streaming protocols for example. Constructing the hybrid stream may, in some examples, comprise creating or modifying a manifest file associated with the digital content, for example to include data or metadata associated with the determined first and second one or more encoded video frames, such as data or metadata associated with available stream segments of the hybrid stream, bitrate options, and adaptive streaming logic. It will be appreciated that in some examples, constructing the hybrid stream may comprise only one or more parts of such a process, such as defining video frame positioning, sequencing rules, or configuring or updating a manifest file, rather than the entire encoding and transmission workflow.

In some examples, the constructed hybrid stream may be provided to the device for presenting of the digital content, which may comprise decoding the determined first one or more encoded video frames of the first stream and the determined second one or more encoded video frames of the second stream at the device for playback. The constructed hybrid stream may be provided to the device in any suitable manner, and may, for example, be streamed to the device from a server. Such streaming may follow any suitable streaming or transmission protocols.

In some examples, the one or more encoding parameters may comprise any suitable encoding parameters, and may for example be selected from the group: a resolution; a frame rate; a quantization level; a group of pictures structure; a quality metric. In some examples, the first stream is associated with a first encoding parameter indicative of the first network load metric, and the second stream is associated with a second encoding parameter indicative of the second network load metric higher than the first network load metric. In some examples, therefore, the one or more encoding parameters associated with the second stream exert a greater network load than those associated with the first stream, such that inclusion of encoded video frames of the second stream in the first stream, for example as supplement or replacement to corresponding encoded video frames of the first stream, increases a network load metric (such as a bitrate) associated with the hybrid stream when compared with that of the first stream. In some examples, such as wherein the one or more encoding parameters comprise a resolution, a resolution associated with video frames of the second stream is higher than a resolution of video frames of the first stream. In some such examples, combining the higher resolution frames of the second stream within the lower resolution first stream may act to improve the quality of the first stream when provided together as the hybrid stream.

In some examples, at least one of the determined video frames of the second stream is an independently decodable frame, such as a keyframe, an intra-coded (I) frame, or an Instantaneous Decoder Refresh (IDR) frame. The inclusion of independently coded frames or independently decodable frames within the determined video frames of the second stream may act to serve as reference points for inter-frame compression and error resilience during the decoding of the one or more encoded video frames of the second stream, to ensure that additional frames within a segment or group of pictures (GOP) structure which are dependent on the independently decodable frames can be decoded without errors. It will be appreciated that the one or more encoded video frames of the second stream may comprise one or more inter-coded frames which are configured to use the one or more independently decodable frames as a reference during decoding. Any suitable type of independently decodable frames will be appreciated, such as for example I-frame; IDR frame; keyframe; Clean Random Access (CRA) frame; Intra Random Access Point (IRAP) frame; Switching Intra (SI)-frame; Golden frame; Alternate Reference (Alt-Ref) frame; forward keyframe; Random Access Point (RAP) frame, among others as will be appreciated.

In some examples, a threshold number of video frames of the second stream may be determined based on the network load differential, such as the bitrate differential. In some such examples, the determining of the second one or more encoded video frames of the second stream is based on the threshold number. In some examples therefore, a maximum number of encoded video frames of the second stream may be determined such that the hybrid stream remains within the constraints of the network or channel capacity, such as the bitrate capacity. The network load differential, such as the bitrate differential, may be used to define the threshold number of video frames of the second stream to be included in the hybrid stream. Any other suitable metric may also be used to determine the threshold number of video frames of the second stream. For example, in some cases a network connection of the device configured to receive the hybrid stream may experience connection drops or instability, such that peak network load differential greatly exceeds a time-averaged network load differential, and in some such examples a time-averaged network load differential may be used to determine the threshold number. In some examples, the threshold number may be a dynamic threshold number, and may for example be based on a current, or moving average network load differential. Such a dynamic threshold number may be used in some examples to change or update a current number of video frames of the second stream to be included in the hybrid stream.

In some examples, determining the first one or more encoded video frames of the first stream and the second one or more encoded video frames of the second stream may comprise: determining, based on the network load differential, a threshold temporal distance between a first video frame of the second stream and a second video frame of the second stream; and determining, based on the threshold temporal distance, the first one or more encoded video frames of the first stream and the second one or more encoded video frames of the second stream for constructing the hybrid stream. The threshold temporal distance may, in some examples, be a minimal threshold temporal distance. As such in some examples the threshold temporal distance may inform an upper threshold frequency of the second one or more video frames of the second stream within the hybrid stream. By increasing the number of video frames of the second stream within the hybrid stream, the comparative quality of the hybrid stream when compared with the first stream may be improved.

In some examples, determining the first one or more encoded video frames of the first stream and the second one or more encoded video frames of the second stream may comprise: determining a quality metric associated with the video frames of the first stream and the video frames of the second stream; determining a difference between the quality metric of the video frames of the first stream and the quality metric of the video frames of the second stream; and determining, based on the difference, the first one or more encoded video frames of the first stream and the second one or more encoded video frames of the second stream for constructing the hybrid stream. The determining of the difference may in some examples comprise determining the difference between quality metrics of corresponding, aligned or temporally co-located video frames of the first and second streams. In some examples wherein it is intended to improve a quality of a first stream within the constraints of a network or channel capacity, such as a bitrate capacity, it may be desired to prioritize the determining of the second one or more video frames of the second stream to those which impart a greater overall quality upon the first stream.

For example, in some instances, while one or more video frames of the second stream may comprise a lower compression level (and thereby statistically fewer compression artefacts), or a higher resolution, than corresponding frames of the first stream, overall objective quality improvements of the frames on the second stream over those of the first stream may be minimal. It may therefore be determined that the increase in network or channel capacity occupied by the second stream video frames is not worth the limited quality improvement they will impart by their inclusion into the hybrid stream.

In some examples, the difference in the quality metrics between video frames of the first and second streams may be compared with a predetermined quality improvement threshold. In some such examples, the determining of the first one or more encoded video frames of the first stream and the second one or more encoded video frames of the second stream for constructing the hybrid stream may be performed based on the comparison of the difference to the quality improvement threshold. As such, in some examples, only video frames of the second stream comprising quality metrics distinguished from those of corresponding video frames of the first stream by at least the quality improvement threshold may be considered for inclusion in the hybrid stream.

The term "quality metric" will be understood to mean any suitable measurable indicator used to assess the perceptual or objective quality of one or more video frames within a stream, for example, but not limited to, Video Multi-Method Assessment Fusion (VMAF). Such quality metrics may provide a quantitative evaluation of one or more visual characteristics of the one or more video frames such as distortions, fidelity, or user experience. It will be appreciated that any suitable one or more quality metrics may be used, and may for example comprise one or more full-reference (FR) quality metrics, one or more reduced-reference (RR) quality metrics, and/or one or more no-reference (NR) quality metrics. Determination of which quality metrics to use may depend on a particular use case or application. Application-specific metrics, including Quality of Experience (QoE) metrics, Generalized Quality of Service Metric (GQoSM), and ITU-TP.1203, may be useful in providing quality assessments tailored to streaming and adaptive bitrate scenarios. In some examples, any suitable trained machine learning model may be used to perform a quality assessment or classification of one or more video frames, and output a corresponding said quality metric. Such a machine learning model may be train on a training dataset comprising historic video frame data pre-labelled with any suitable quality metric. By way of example only, and without limitation, the quality metric may be one or more selected from the group: Video Multi-Method Assessment Fusion (VMAF); Peak Signal-to-Noise Ratio (PSNR); Structural Similarity Index (SSIM); Multi-Scale Structural Similarity Index (MS-SSIM); Feature Similarity Index (FSIM); Spatio-Temporal Reduced-Reference Entropic Differencing (ST-RRED); Butteraugli; High Dynamic Range Video Quality Metric (HDR-VQM); Normalized Quality Index (NQI); Reduced-Reference Entropic Differencing (RRED); Gradient Magnitude Similarity Deviation (GMSD); Naturalness Image Quality Evaluator (NIQE); Blind/Referenceless Image Spatial Quality Evaluator (BRISQUE); Perception-based Image Quality Evaluator (PIQE); Spatial Information (SI); Temporal Information (TI); Blind Image Integrity Notator using DCT Statistics (BLIINDS); Video Intrinsic Integrity and Distortion Evaluation Oracle (VIIDEO); Mean Opinion Score (MOS); Differential Mean Opinion Score (DMOS); Generalized Quality of Service Metric (GQoSM); Quality of Experience (QoE); ITU-T Perceptual Quality Model for HTTP Adaptive Streaming (P.1203).

In some examples, determining the first one or more encoded video frames of the first stream and the second one or more encoded video frames of the second stream may comprise: determining one or more visual characteristics of the video frames of the first stream; and determining, based on the one or more visual characteristics, the first one or more encoded video frames of the first stream and the second one or more encoded video frames of the second stream for constructing the hybrid stream. The determining of the one or more visual characteristics may in some examples comprise comparing one or more visual characteristics of the video frames of the first stream to a predetermined visual characteristic threshold. In some examples wherein it is intended to improve a quality of a first stream within the constraints of a network or channel capacity, such as a bitrate capacity, it may be desired to prioritize the determining of the second one or more video frames of the second stream to frames in which a particular visual characteristic, such as detail, texture and motion, may meet a corresponding threshold, rather than those which comprise visual characteristics, such as level of detail, texture and motion, below the threshold.

For example, in some instances, while one or more video frames of the second stream may comprise a lower compression level (and thereby statistically fewer compression artefacts), or a higher resolution, than corresponding frames of the first stream, there may be little motion, few details or low variety of textures in the frames. It may therefore be determined that the increase in network or channel capacity occupied by the second stream video frames is not worth the limited improvement of the visual characteristics imparted by the frames when included into the hybrid stream.

In some examples, the determining of the first one or more encoded video frames of the first stream and the second one or more encoded video frames of the second stream for constructing the hybrid stream may be performed based on the comparison of the one or more visual characteristics to the visual characteristics threshold. As such, in some examples, only video frames of the second stream comprising visual characteristics meeting or exceeding the threshold may be considered for inclusion in the hybrid stream.

The term "one or more visual characteristics" will be understood to mean any suitable one or combination of measurable attributes that define a perceptual and structural composition of a video frame, which may for example influence an importance of the video frame in the context of video encoding, transmission, and processing. Such characteristics may, for example, include detail level, which may in some examples represent one or more of: textures; edges; edge thickness; and edge sharpness. In some examples the visual characteristics may comprise texture complexity, which may describe a variation and granularity of surface patterns in a video frame. In some examples the visual characteristics may comprise contrast, which may define a difference between light and dark areas of the video frame and may affect the visibility of scene elements. In some examples the visual characteristics may comprise one or more color attributes, which may for example include hue, saturation, and luminance, and may play a role in visual perception and scene distinction. In some examples the visual characteristics may comprise motion magnitude and complexity, which may characterize how objects move within the video frame, and may impact inter-frame prediction efficiency and frame significance in dynamic content. The one or more visual characteristics may comprise a quantifiable value, which may in some examples be compared against a corresponding visual characteristic threshold value, such as when determining the inclusion of the corresponding second one or more video frames of the second stream in the hybrid stream. For example, video frames having low motion (e.g., having, or associated with, a motion value not meeting or exceeding a predefined motion threshold) may be deemed less visually important and may therefore be deprioritized when determining frames of the second stream for constructing the hybrid stream. In some examples, video frames exhibiting a high detail value or a high contrast value may be prioritized for inclusion in the hybrid stream. The assessment of visual characteristics may therefore enable adaptive hybrid stream optimization, and increase perceptual quality enhancements over the first stream, within the bounds of the network or channel capacity, by dynamically assigning importance to video frames based on their contribution to visual fidelity and scene continuity.

In some examples, providing the hybrid stream may comprise: streaming the determined first one or more encoded video frames of the first stream and the second one or more encoded video frames of the second stream to the device, for example for decoding during playback. As such, in some examples, the term "providing the hybrid stream" may refer to a communication or streaming of the hybrid stream to the device, for example by way of a server.

In some examples, providing the hybrid stream may comprise: generating or modifying a manifest file associated with the digital content to identify the determined first one or more encoded video frames of the first stream and the second one or more encoded video frames of the second stream. As such, in some examples, the term "providing the hybrid stream" may refer to a generation or modification of data or metadata associated with the hybrid stream, such as by way of a manifest file, for use in a later communication or streaming of the hybrid stream to the device, for example by way of a server. In some examples, the modifying of the manifest file may comprise receiving, identifying or retrieving the manifest file associated with the digital content. In some examples, the modifying of the manifest file may comprise communicating the modified manifest file, for example to the device configured to receive the hybrid stream.

According to further aspects of systems and methods described herein, one or more network parameters, such as of a device configured to receive a hybrid stream of video frames of a digital content, are determined, the one or more network parameters comprising a network capacity, such as a bitrate capacity.

In some examples, the one or more network parameters may be communicated to a server for selecting, based on the one or more network parameters, a first stream from a plurality of streams of the digital content stored to a memory or storage of one or more server devices, each stream of the plurality of streams associated with a corresponding one or more encoding parameters used to encode the video frames, the one or more encoding parameters indicative of a network load metric such as a bitrate.

In some examples, after communicating the one or more network parameters and based on a network load differential (such as a bitrate differential) between the network load capacity and a first network load metric (such as first bitrate) of the first stream, a hybrid stream may be received including: (i) a first one or more encoded video frames of the first stream stored to memory or storage; and (ii) a second one or more encoded video frames of a second stream of the plurality of streams stored to memory or storage, the second stream associated with one or more encoding parameters indicative of a second network load metric (such as a second bitrate) higher than the first network load metric.

In some examples, each of the received first one or more encoded video frames of the first stream and the received second one or more encoded video frames of the second stream may be decoded for displaying the digital content. In some examples, the hybrid stream may be received at the device configured to receive a hybrid stream for displaying the digital content on a display screen thereof. The receiving of the hybrid stream may be by any suitable manner of communication, and may for example be by way of streaming to the device by way of a server. Such streaming may follow any suitable streaming or transmission protocols.

It will be appreciated that any process steps and functionality of the present disclosure, in any suitable combination thereof, may be performed on a client device, such as a user device, or at a server. The performance of steps or functionality at a server may in some cases act to conserve memory or storage and computational processing resources on a client device.

It will be appreciated that any features described herein as being suitable for incorporation into one or more aspects, embodiments or examples of the present disclosure are intended to be generalizable across any and all aspects, embodiments and examples of the present disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 depicts a flowchart representing steps of an example process for providing hybrid streams of digital content, such as using the example system of FIG. 1, in accordance with some examples of the disclosure;

FIG. 8 is a block diagram showing components of an example system for providing hybrid streams of digital content, in accordance with some examples of the disclosure.

DETAILED DESCRIPTION

Figure 1:
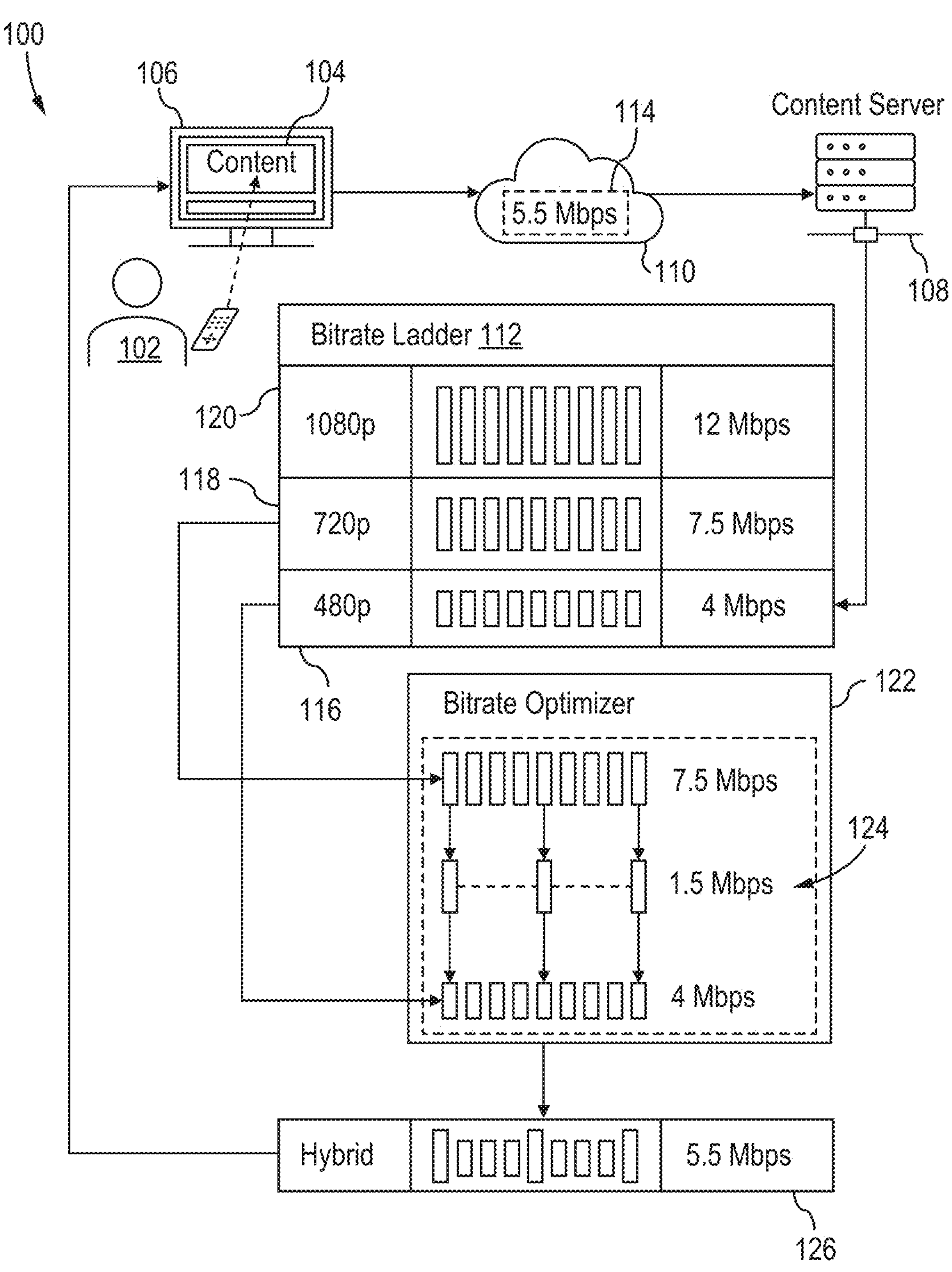
FIG. 1 illustrates an overview of an example system of providing hybrid streams of digital content, in accordance with some examples of the disclosure.

FIG. 1A illustrates an overview of an example system 100 of providing hybrid streams of digital content, in accordance with some examples of the disclosure. A user 102 may select a digital content 104 for viewing at a device 106, such as a smart television 106. The device 106 may, in response to the selection, communicate a request for receiving the digital content to a remote content server 108 by way of a communication channel on a network 110, to receive the digital content 104. The content server 108 may store one or more encoded versions of the digital content 104 at a memory or storage thereof, and may be configured to, in response to the request, communicate a manifest file associated with the digital content 104 to the device 106, the manifest file comprising a bitrate ladder 112 indicating a plurality of available bitrate versions 116, 118, 120 of the digital content 104 which are encoded and stored at the memory or storage of the content server 108.

The communication channel may comprise one or more network parameters, such as indicating a channel capacity 114, which in the example shown is 5.5 Mbps. The channel capacity 114 may be stable, or may fluctuate over time based on any number of factors influencing a connection quality of the device 106 on the network 110. The connection quality may may be constrained by one or more parameters which may include, for example, bandwidth, latency, jitter, packet loss, network congestion, network performance or efficiency, among others as will be appreciated. The channel capacity 114 may be determined by the device 106 or by the content server 108, in any suitable manner as will be appreciated. For example, the device 106 may be configured to determine or estimate the channel capacity 114 based on one or more network parameters associated with receiving the manifest file from the content server 108, or associated with the receipt and buffering of initial segments of the digital content 104 which may be communicated to the device at an initial default bitrate.

Based on the determined or estimated channel capacity 114, and the available bitrate versions of the digital content 104 indicated in the bitrate ladder 112 of the manifest file, the device 106 may be configured to request a bitrate version of the digital content 104, such as a highest possible resolution version 116, 118, 120 of the digital content 104, which can be communicated to the device 106 within the limits of the channel capacity 114. For example, available encoded bitrate versions indicated by the bitrate ladder 112 in the example 100 shown are provided as resolution-bitrate pairings including: 480p at 4 Mbps (version 116); 720p at 7.5 Mbps (version 118); and 1080p at 12 Mbps (version 120). If the channel capacity 114 is determined or estimated to be 5.5 Mbps, the highest resolution version of the digital content 104 which is within the available channel capacity 114 is 480p at 4 Mbps (version 116).

When communicated to the device 106 by the content server 108 by way of a memory or storage thereof, in response to the request, the selected bitrate version 116 does not occupy the full channel capacity 114, with around 1.5 Mbps of channel capacity 114 remaining. This surplus of 1.5 Mbps in the channel capacity 114 may mean that a higher quality version of the digital content 104 may be communicated to the device 106 than is currently permitted by the predefined bitrate versions 116, 118, 120 of the digital content 104 within the bitrate ladder 112. It may therefore be desired to improve the quality of the bitrate version 116 of the digital content 104 communicated to the device 106 by the content server 108. A video enhancement process, such as a super resolution process, may be applied to upscale the resolution of the video frames of digital content 104 received as part of the communicated bitrate version 116. Such a process is, however, limited by the quality of the input video frames of the bitrate version 116 received, which may be subject to harsh compression levels and consequential compression artefacts which may limit the effectiveness of super resolution processes in enhancing the quality of the video frames to which the process is applied.

As depicted in FIG. 1, systems and methods of the present disclosure may make use of the higher quality versions of a digital content to improve the objective quality of a received digital content stream, such as by improving the effectiveness of video enhancement processes applied during or following decoding, In particular, the bitrate differential (1.5 Mbps) between the bitrate version 116 of the digital content 104 (4 Mbps) and the available channel capacity 114 (5.5 Mbps) may be determined in any suitable manner. The bitrate differential may for example be determined by a bitrate optimizer logic 122, such as the device 106 and communicated to the server 108, at the server 108 itself, or by one or more intermediary processes or servers.

The bitrate optimizer 122 is configured to parse the manifest file to identify the available bitrate versions of the bitrate ladder 112. The bitrate optimizer 122 may then, based on the bitrate differential (1.5 Mbps in the example described), identify a higher bitrate version 118 of the digital content 104 (associated with a bitrate of 7.5 Mbps) from the bitrate ladder 112. Following the identification of the higher bitrate version 118, the bitrate optimizer 122 may determine, from the higher bitrate version 118, a set of one or more encoded video frames 124 of the higher bitrate version 118 (at 7.5 Mbps) for combining with the selected bitrate version 116 (at 4 Mbps) to construct a hybrid stream 126 (at or below 5.5. Mbps) of the digital content 104. The constructing of the hybrid stream 126 may be performed in any suitable manner, such as described herein, and for example the set of one or more encoded video frames 124 of the higher bitrate version 118 (at 7.5 Mbps) may be present in the hybrid stream 126 together with corresponding or temporally co-located video frames of the selected bitrate stream 116 (at 4 Mbps). Alternatively, the set of one or more encoded video frames 124 of the higher bitrate version 118 (at 7.5 Mbps) may be used to supplement or replace, after decoding, corresponding or temporally c-located video frames of the selected bitrate stream 116 (at 4 Mbps) in the hybrid stream 126 as shown in FIG. 1.

The constructing of the hybrid steam 126 may, in some examples, be performed on a segment-by-segment basis such that any fluctuations in the channel capacity 114, for example based on varying network conditions, may be reflected in the constructing of subsequent segments of the hybrid stream 126 of the digital content 104.

Following constructing of the hybrid stream 126 by the bitrate optimization logic 122, performed at any suitable device as described, the hybrid stream 126 may be communicated to the device 106 for decoding for playback. The decoding and playback process may be performed in any suitable manner. For example, the decoding and playback may include a decoding of the encoded video frames of the hybrid stream 126 for display in chronological order such that the presence of the set of higher resolution frames 118 distributed within the set of lower resolution frames 116 increases the quality of the playback of the digital content 104.

The decoding and playback process may, in some examples, comprise the application of a visual enhancement process, such as a super resolution process, to the decoded video frames of the hybrid stream 126. In some examples, the set of one or more encoded video frames 124 of the higher bitrate version 118 (at 7.5 Mbps) may be used as seed frames for the visual enhancement process. In some examples therefore, the higher resolution frames may be used to provide higher quality spatial feature information such that the effects of a harsher compression level on the selected bitrate version 116 (at 4 Mbps) may be mitigated.

Therefore, the present systems and methods may combine different pre-encoded versions of a digital content to improve the quality of a stream, based on a surplus channel capacity, thereby increasing the granularity of encoded stream versions without the need for performing any new encoding processes or generating new associated metadata.

With reference to FIG. 2, a flowchart is shown representing steps of an example process 200 for providing hybrid streams of digital content, such as using the example system of FIG. 1, in accordance with some examples of the disclosure. The example process 200 of FIG. 2 is performed substantially as described in relation to the system 100 of FIG. 1. The process 200 comprises, at 202, determining one or more network parameters of a device configured to receive a hybrid stream of video frames of a digital content, the one or more network parameters comprising a bitrate capacity. The one or more network parameters may be any suitable network parameters configured to indicate a channel capacity of a communication channel of the device, such as between the device and a server as described in relation to FIG. 1. The one or more network parameters may, for example, indicate a maximum rate at which data packets may be received by the device, for example a maximum bitrate corresponding to the bitrate capacity.

The process 200 further comprises, at 204, selecting, based on the one or more network parameters, a first stream from a plurality of streams of the digital content, each stream of the plurality of streams stored to memory or storage associated with a corresponding one or more encoding parameters used to encode the video frames, the one or more encoding parameters indicative of a bitrate. The one or more encoding parameters may be any suitable encoding parameters from which an associated bitrate of the corresponding stream may be determined. For example, if encoding of the video frames of the digital content comprises the selection of the bitrate (e.g., a constant bitrate) at which the video frames are to be encoded, the one or more encoding parameters may comprise a bitrate. In some such examples, the one or more encoding parameters may also comprise any further encoding parameters which may be used to encode the video frames. In some examples, if encoding of the video frames of the digital content comprises the selection of one or more other parameters, such as a quality setting (e.g., a target resolution for the stream) at which the video frames are to be encoded, the one or more encoding parameters may simply indicate a bitrate of the stream resulting as a biproduct of the encoding process. In some such examples, the one or more encoding parameters may also comprise any further encoding parameters which may be used to encode the video frames, and may comprise said bitrate.

The plurality of streams, including the first encoded stream, may be stored to any suitable one or more memory or storage devices, for example one or more memory or storage devices of a content server, such as part of a content delivery network (CDN). The selection of the first encoded stream based on the one or more network parameters (such as bitrate capacity) may comprise comparing the indicated first bitrate of the first encoded stream with the one or more network parameters and determining that the first bitrate is equal to or less than the one or more network parameters, for example the bitrate capacity. The selection of the first stream may therefore comprise a determination that the first stream can be communicated to the device by way of the network based on the one or more network parameters.

The process 200 further comprises, at 206, determining a bitrate differential between the bitrate capacity and a first bitrate of the first stream stored to memory or storage. The bitrate differential may be determined in any suitable manner and may, for example comprise subtracting the first bitrate from the bitrate capacity. In some examples, the selection of the first encoded stream based on the one or more network parameters (such as bitrate capacity) may comprise the determining of the bitrate differential. In some examples, selecting the first stream may comprise determining that the first stream has the smallest bitrate differential between the indicated first bitrate and the bitrate capacity, of the plurality of streams. Therefore, selecting the first stream may comprise determining which stream, of the plurality of streams, comprises the highest indicated bitrate which is within the constraints of the bitrate capacity. As such, the quality of the first stream may be proportional to the available bitrate capacity in some examples.

The process 200 further comprises, at 208, determining based on the bitrate differential: (i) a first one or more encoded video frames of the first stream stored to memory or storage, and (ii) a second one or more encoded video frames of a second stream of the plurality of streams stored to memory or storage, the second stream associated with one or more encoding parameters indicative of a second bitrate higher than the first bitrate. The determining of the first and second video frames may be performed in any suitable manner, for example such that if the determined first and second one or more encoded video frames are combined as a hybrid stream, the hybrid stream is indicative of, associated with, or comprises, a bitrate which is lower than the bitrate capacity. In some examples, the determining of the first and second one or more encoded video frames comprises determining at least second encoded video frame which comprises an indicated bitrate which is less than the bitrate differential, for example such that if the determined second one or more video frames are combined with the first stream, the indicated bitrate of the combined stream is less than the bitrate capacity. In some examples, determining the first and second one or more encoded video frames may comprise selecting one or more first said video frames from the first stream and one or more second said video frames from the second stream, within the constraints of the bitrate capacity. Therefore, in some examples, any suitable number of encoded video frames from the second stream may be combined with any suitable number of encoded video frames from the first stream within the constraints of the bitrate capacity. In some examples, determining the first one or more encoded video frames may comprise determining an amount of the first one or more encoded video frames which is less than the amount of video frames in the first stream.

The process 200 further comprises, at 210, constructing the hybrid stream comprising the determined first one or more encoded video frames of the first stream and the determined second one or more encoded video frames of the second stream. The constructing of the hybrid stream may comprise any suitable portion of a stream construction process, and may for example comprise encoding one or more of the first and second one or more video frames according to a defined compression scheme; defining video frame placement or positioning rules to structure intra-coded and inter-coded frames of the first and second one or more frames within a sequence of video frames of the hybrid stream; determining, selecting or defining one or more transmission sequence rules, for example to determine an order in which the first or second one or more video frames of the hybrid stream, or associated packets, are communicated; and/or segmenting or formatting video frame data of the first and second one or more encoded video frames into a communication-ready structure suitable for streaming protocols, such as adaptive streaming protocols for example. Constructing the hybrid stream may, in some examples, comprise creating or modifying a manifest file associated with the digital content, for example to include data or metadata associated with the determined first and second one or more encoded video frames, such as data or metadata associated with available stream segments of the hybrid stream, bitrate options, and adaptive streaming logic. It will be appreciated that in some examples, constructing the hybrid stream may comprise only one or more parts of such a process, such as defining video frame positioning, sequencing rules, or configuring or updating a manifest file, rather than the entire encoding and transmission workflow.

The process 200 further comprises, at 212, providing the constructed hybrid stream for presentation of the digital content at the device. The providing of the constructed stream may be performed by any suitable communicating device, for example a content server, by way of a bitrate optimization server. The communication of the constructed stream may be by way of streaming on the network or channel such that the constructed stream is accommodated within the network or channel capacity, such as the bitrate capacity, thereof.

Figures 3, 4:
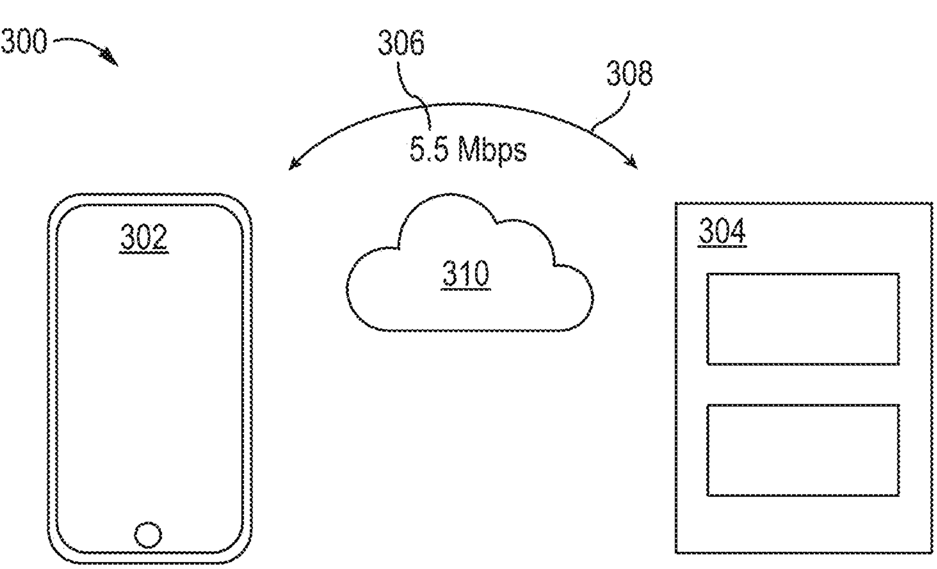
FIG. 3 depicts an example determination of network parameters of a communication channel between a device and a server, suitable for use in accordance with the disclosure.
FIG. 4 depicts an example bitrate ladder displaying predefined bitrate versions of a digital content and corresponding encoding parameters, in accordance with the present disclosure.

Referring to FIG. 3, an example step 300 of determination of network parameters of a communication channel 308 is shown between a device 302 (e.g., device 106) and a content server 304 (e.g., content server 108) over a network 310, suitable for use in accordance with the disclosure. The device 302 in the example 300 shown is a smartphone 302, but the device 302 may be any suitable device configured to receive digital content, for example from the server 304 by way of a content stream. The network parameters may be any suitable parameters and may indicate a network or channel capacity 306 defining a maximum amount of data that can be transmitted over the channel 308 and successfully received by the device 302 within a given period of time. This capacity 306, which may for example be expressed in megabits per second (Mbps) as shown, may represent an upper bound on the volume of communication (e.g., packets, video frames, or segments) that the channel 308 can sustain at the time of determining the one or more network parameters. In practice, the channel or network capacity 306 may fluctuate dynamically over time due to varying conditions of the network 310, including congestion, interference, and signal degradation, meaning that the actual available throughput at any given moment may be different to (for example, lower than) the theoretical maximum capacity of a particular channel 308 or network 310.

The channel capacity 306 may be determined by the device 302 or by the content server 304, in any suitable manner as will be appreciated. For example, the device 302 may be configured to determine or estimate the channel capacity 306 based on one or more network parameters associated with a communication on the network 310, for example a communication with the server 304. By way of example, upon receiving instructions to request a particular digital content from the server 304, the device may receive or access a manifest file associated with the requested digital content by way of the content server 304.

The communication of the manifest file may in some examples be used by the device 302 or the server 304 to determine, estimate or measure one or more network parameters from which the channel capacity 306 may be determined or estimated. In some examples, following the accessing or communication of the manifest file for the digital content, the device 302 or the server 304 may initiate communication of one or more initialization video frames of the digital content, for example at an initial bitrate (such as the lowest available bitrate). The communication of the initialization video frames may be used by the device 302 or the content server 304 to determine, estimate or measure one or more network parameters from which the channel capacity 306 may be determined or estimated, such as associated with the receipt and buffering of the initialization video frames or segments of the digital content.

The manifest file may provide a structured metadata file defining characteristics, structure, and retrieval methods associated with the requested digital content. The manifest file may, for example, provide a list of available streams of the requested digital content, each stream specifying associated encoding parameters (such as an associated bitrate, resolution, frame rate, and codec options), allowing the device 302 to dynamically select the most suitable stream based on the channel capacity 306. The manifest file may comprise segment information associated with the streams, for example including URLs or file paths to corresponding segments of the stream, along with data characterizing the segments such as segment durations, and sequencing rules defining how the device 302 may request and playback each segment. It may also include initialization video frames or segments, which may provide decoder configuration parameters, and encryption details, such as DRM (Digital Rights Management) keys or other access control mechanisms for secure content delivery. Additionally, the manifest file may define adaptive playback rules, such as switching logic for bitrate selection, buffer constraints, and segment alignment settings. In some cases, metadata related to subtitles, alternate audio tracks, multiple language versions, ad insertion markers, and auxiliary media (e.g., thumbnails or preview clips) may also be included. The manifest file format may depend on a particular streaming protocol used, such as HLS (M3U8) or MPEG-DASH (MPD), and may be used for ensuring smooth, scalable, and adaptive content delivery across various channel and network conditions and device capabilities.

Referring to FIG. 4, an example bitrate ladder 400 is shown, acting as a visual representation of a plurality of predefined bitrate versions of a requested digital content, and corresponding encoding parameters, as parsed from an associated manifest file of the digital content accessed by way of a content server (e.g., content server 108, 304).

The example bitrate ladder 400 defines the bitrate versions as resolution-bitrate pairings, the pairings ranging from: 3840×2160 (e.g., 4K) at 15 Mbps 402; 1920×1080 (e.g., 1080p) at 7.5 Mbps 404; 1280×720 (e.g., 720p) at 4 Mbps 406; 720×480 (e.g., 480p) at 2.5 Mbps 408; 540×360 (e.g., 360p) at 1.5 Mbps 410; and 360×240 (e.g., 240p) at 1 Mbps 412. Any suitable bitrate ladder may be provided, and the corresponding bitrate versions of the digital content may be distinguished in any suitable manner, such as in accordance with any combination of encoding parameters used to encode the video frames of the digital content.

For illustration purposes, each bitrate version of the example bitrate ladder 400 is shown depicting the corresponding resolutions of the video frames of the bitrate version.

In use, a device (e.g., device 106, 302) for receiving a hybrid stream may, based on one or more determined network parameters indicating a network or channel capacity, select one of the bitrate streams 402, 404, 406, 408, 410, 412 according to the highest resolution for which the associated bitrate is within the constraints of the network or channel capacity. Taking the device 302 of FIG. 3 as an example, the channel capacity may be determined to be 5.5 Mbps. The device 302 may therefore select the highest resolution version with an indicated bitrate equal to or lower than 5.5 Mbps, which is the 720p stream 406 at 4 Mbps. The device 302 may therefore request to receive the selected stream 406 by way of the content server 304. There exists, however, a bitrate differential between the determined channel capacity of 5.5 Mbps and the indicated bitrate (4 Mbps) of the selected stream 406. Systems and methods of the present disclosure may be configured to, based on the resulting bitrate differential of 1.5 Mbps, determine one or more encoded video frames of a higher resolution version 402, 404 of the digital content as shown in FIG. 5A, to communicate alongside video frames of the selected bitrate version 406 as a hybrid stream within the constraints of the determined channel capacity (5.5 Mbps).

Figure 5A:
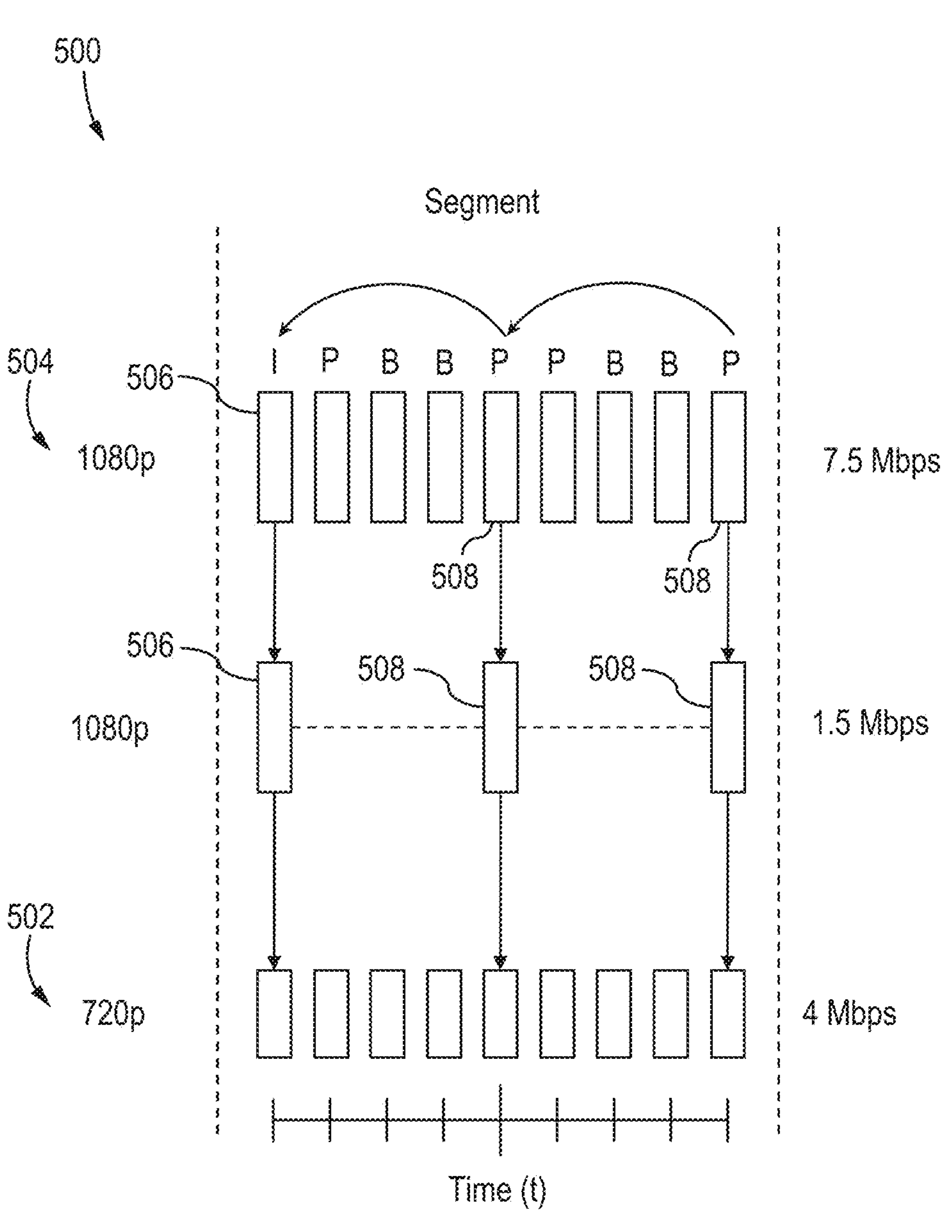
FIG. 5A shows example steps in a process of determining video frames from a first and second stream of the video content of FIG. 4, suitable for use in accordance with the present disclosure.

Referring to FIG. 5A, example steps in a process 500 of determining one or more encoded video frames from a first stream 502 and a second stream 504 of the video content of FIG. 4 are shown, suitable for use in accordance with the present disclosure. In the example 500 shown, the first stream 502 and the second stream 504 correspond to the selected lower resolution stream (406, 720p) and the determined higher resolution stream (404, 1080p) described in the manifest file 400 of FIG. 4. Based on a determined channel capacity, such as that described herein in relation to the examples of FIG. 1 to FIG. 4, for example based on a determined network load differential, such as a bitrate differential (for example the 1.5 Mbps bitrate differential discussed in relation to FIG. 4), one or more encoded video frames of the second stream 504 may be selected for combination with one or more encoded video frames of the selected first stream 502, within the constraints of the channel capacity or bitrate differential.

In accordance with the present systems and methods, there may be various suitable ways to perform the determination of the first one or more encoded video frames of the first stream and the second one or more encoded video frames of the second stream. Manners of varying complexity may be used based on time and processing constraints. In some examples, the determination may comprise determining, from the second stream, at least one independently decodable video frame 506, for example an I-frame or an IDR frame. In some such examples, the determination may further comprise determining, from the second stream, one or more inter-predicted frames 508 configured to use the at least one independently decodable frame 506 as a reference during decoding (for example one or more P-frames), or which together with the independently decodable frame 506 form a decodable reference frame hierarchy. The determination may, in some examples, comprise determining the at least one independently decodable frame 506 and a maximum number of the inter-predicted frames 508 based on the bitrate capacity (5.5 Mbps) or the bitrate differential (1.5 Mbps), such that the determined frames 506, 508 may be combined with the first stream 502 for transmission as a hybrid stream for decoding at the device. The determined second one or more encoded video frames 506, 508 may in some examples be used as seed frames by an in-loop or out-of-loop video enhancement process, such as video frame upscaling, during the decoding of the first one or more encoded video frames for playback at the device.

In order to provide a quality enhancement of the first one or more encoded video frames of the first stream during decoding for playback, the determined second one or more encoded video frames of the second stream 506, 508 may in some examples be distributed across the duration of the first stream, for example having a spacing therebetween. The spacing may in some examples by an even spacing (for example approximately the same spacing between each subsequent pairing of the determined second one or more video frames 506, 508) or an uneven spacing (for example wherein a spacing between two or more of the pairings is not the same). The distribution of the determined second one or more video frames across the duration of the first stream may in some examples be configured to provide a quality enhancement across the duration of the first stream, and may in some examples be inserted into the decoded first stream for playback or provide a seed frame for a video enhancement process performed on the first one or more video frames of the first stream during or after decoding for playback.

The determination of the second one or more video frames 506, 508 may in some examples depend on a group of pictures (GOP) structure for a segment of the first stream, for example whether the segment comprises a plurality of GOPs, open or closed. In some such examples, any further independently decodable frames of the second stream may be determined for inclusion within the hybrid stream, along with any corresponding inter-predicted frames, within the constraints of the data budget set by the bitrate capacity or the bitrate differential.

By way of example, the determination of the first and second one or more encoded video frames may comprise a rate-distortion optimization step. The determination of the first and second one or more encoded video frames may comprise determining a quality difference between one or more candidate second encoded video frames 506, 508 at a time t, and corresponding first one or more video frames of the first stream. The quality difference determination may be performed in any suitable manner as described herein, for example as:

$Dq(t)=Q_2(t)-Q_1(t)$, wherein $Dq(t)$ is the quality difference at time t, $Q_2(t)$ is a quality metric of a candidate second frame of the second stream at the time t, and $Q_1(t)$ is a quality metric of a corresponding candidate first frame of the first stream at the time t.

If the quality difference is small, for example below a predetermined quality difference threshold, there may be a limited benefit for the candidate second frame to bring a quality enhancement to the first stream. In some examples therefore, candidate second frames may be included when the quality difference is greater than a predetermined quality difference threshold. Any suitable quality metric, for example VMAF, may be used such as described herein. Such a quality evaluation may be used in some examples wherein corresponding segments may be compared.

In some examples, wherein a selection may be made between segments of the first stream on which to perform a video quality enhancement, a quality metric of the first stream or video frames therein may be used as described in the following.

A temporal distance between independently decodable frames 506 of the second stream (Dist_max) may be determined as a maximum distance between candidate second video frames 506, 508. In some examples wherein a segment comprises only a single independently decodable frame 506 as shown in FIG. 5A, Dist_max may be equal to the number of video frames in the segment duration. It may be desirable in some examples to minimize the Dist_max, which may include any other suitable constraints within the visual enhancement process as described herein, such that the determined second one or more encoded video frames 506, 508 are substantially evenly spaced out across the segment of the first stream.

By way of example, when there are multiple sets of candidates of second video frames available within the constraints of the bitrate capacity or the bitrate differential, the determination process may be instructed to find the candidate set of second video frames which maximizes the following term:

$$T_2 = \alpha \cdot \sum_{i=0}^{n-1} \frac{D_{q(i)}}{n} + \beta \frac{1}{\text{Dist\_max}} + \gamma \cdot Q_1,$$

wherein $T_2$ represents, for the candidate set of second video frames, the sum of quality difference, distance, and first stream quality factors; n is the number of candidate frames in the set; $D_q(i)$ is the quality difference between corresponding candidate frames as described; and $Q_1$ is the quality metric of the first stream segment as described; α, β and γ represent weights assigned to the factors of quality, distance, and baseline quality. Such a process is provided by way of example only, and other suitable processes will be appreciated within the context of the present disclosure.

In this example, the combination of second one or more encoded video frames with the first one or more encoded video frames may vary from segment to segment of the digital content. In some examples, one option may be to just decode the first stream segment without using any video frames of the second stream for video enhancement. Such examples may be bitrate capacity-dependent or bandwidth-dependent.

The weights α, β and γ may be subject to any suitable adjustment and finetuning, when the example determination process is implemented. In some examples, the determination process may be performed based on a predetermined or historic set of bitrate capacity data or bitrate differential data for a given device, network or channel, and for a predetermined digital content, as described herein. Since the determination may be performed using pre-encoded video frames of content, for example forming bitrate ladders, there may be a vast amount of data for modeling or correlating the weights, for example using a trained machine learning model.

Other possible formulations for performing the determination of the first and second one or more encoded video frames, and the determination may, in some examples, be extended to include any other suitable factors or parameters, such as described herein. For example, one or more visual characteristics of the video frames, such as texture complexity or motion complexity (among others which will be appreciated, such as described herein), can be assessed. In some examples, such visual characteristics may be assessed from existing or historic data to determine one or more weights (such as those described) regarding the spatial and temporal quality of candidate second video frames.

In some examples, a digital content streaming service or application may implement and control the determination for video enhancement at playback. In some such examples, the determination may be integrated into any one or more steps or processes performed by the digital content streaming service or application, for performing video quality enhancement within the constraints of a bitrate capacity or bitrate differential.

While the determined video frames in the example 500 shown in FIG. 5A are evenly spaced in the temporal domain, any appropriate spacing may be used and may in some cases not comprise even spacing.

Figures 5B, 5C:
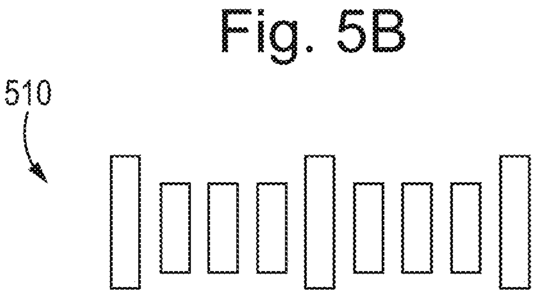
FIG. 5B shows an example hybrid stream formed using the example determining process of FIG. 5A, suitable for use in accordance with the present disclosure.
FIG. 5C shows an example modified version of the bitrate ladder of FIG. 4, comprising the hybrid stream of FIG. 5B, suitable for use in accordance with the present disclosure.

The selected frames of the first and second streams 502, 504 are used to construct a hybrid stream 510 as shown in FIG. 5B, which for illustration purposes shows the video frames of the second stream 504 in the corresponding temporal positions and replacing the corresponding frames of the first stream 502. Examples will be appreciated wherein the determined video frames of the second stream 504 may be combined with video frames of the first stream in any suitable manner, and may for example not require the supplementing or replacement of corresponding frames of the first stream 502. In some examples, the hybrid stream may comprise a bitstream of the determined video frames of the second stream combined with a bitstream of the determined video frames of the first stream, without any video frame supplementing or replacement in the first stream, such that required frame referencing and inter-frame dependencies are maintained for all video frames of the first stream when decoding. The frames of the hybrid stream 510 may in some examples be communicated to the device in any suitable order, which may be defined by network conditions or an associated communication or decoding protocol.

As such, systems and methods may be used to provide a more granular list of bitrate versions of a digital content specifically constructed based on current or fluctuating network constraints, thereby providing a more enhanced bitrate ladder 520 of the digital content as shown in FIG. 5C.

Figure 6:
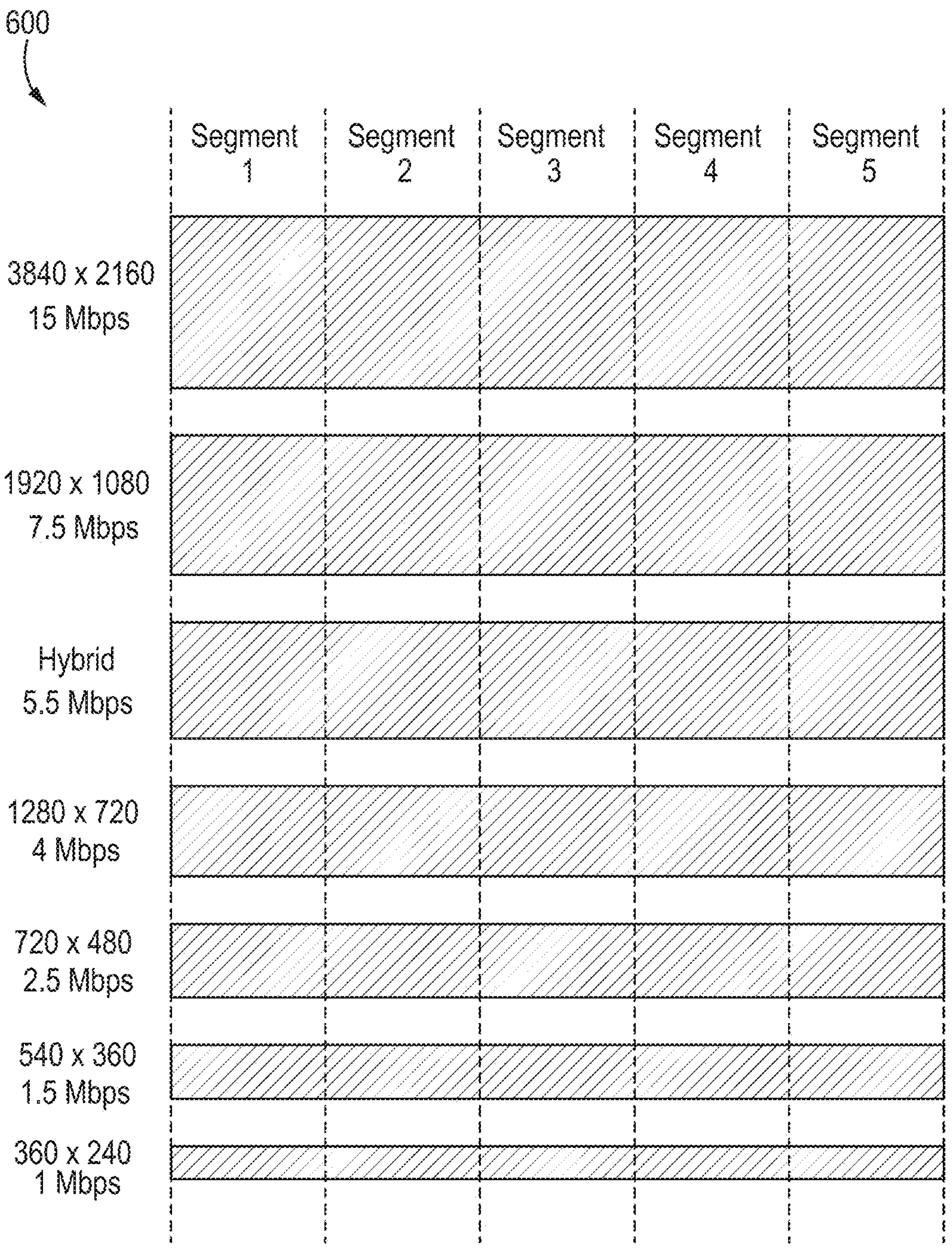
FIG. 6 shows an example sequence of available segments of the digital content of FIG. 4 following the determining step of FIG. 5A, suitable for use in accordance with the present disclosure.

It will be appreciated that network conditions of a device receiving a hybrid stream in accordance with the present disclosure may vary over time and as such a corresponding channel capacity may be subject to change. The determination of the one or more network parameters, the selection of a first stream, and the determination of the first and second one or more encoded video frames for constructing the hybrid stream to be communicated to the device may be performed at any suitable frequency, and may for example be performed per segment of the digital content to be streamed. Referring to FIG. 6, a chart 600 displaying a plurality of segments of the digital content is shown, the digital content split into the plurality of segments encoded at bitrate levels of the modified bitrate ladder of FIG. 5C.

Figure 7:
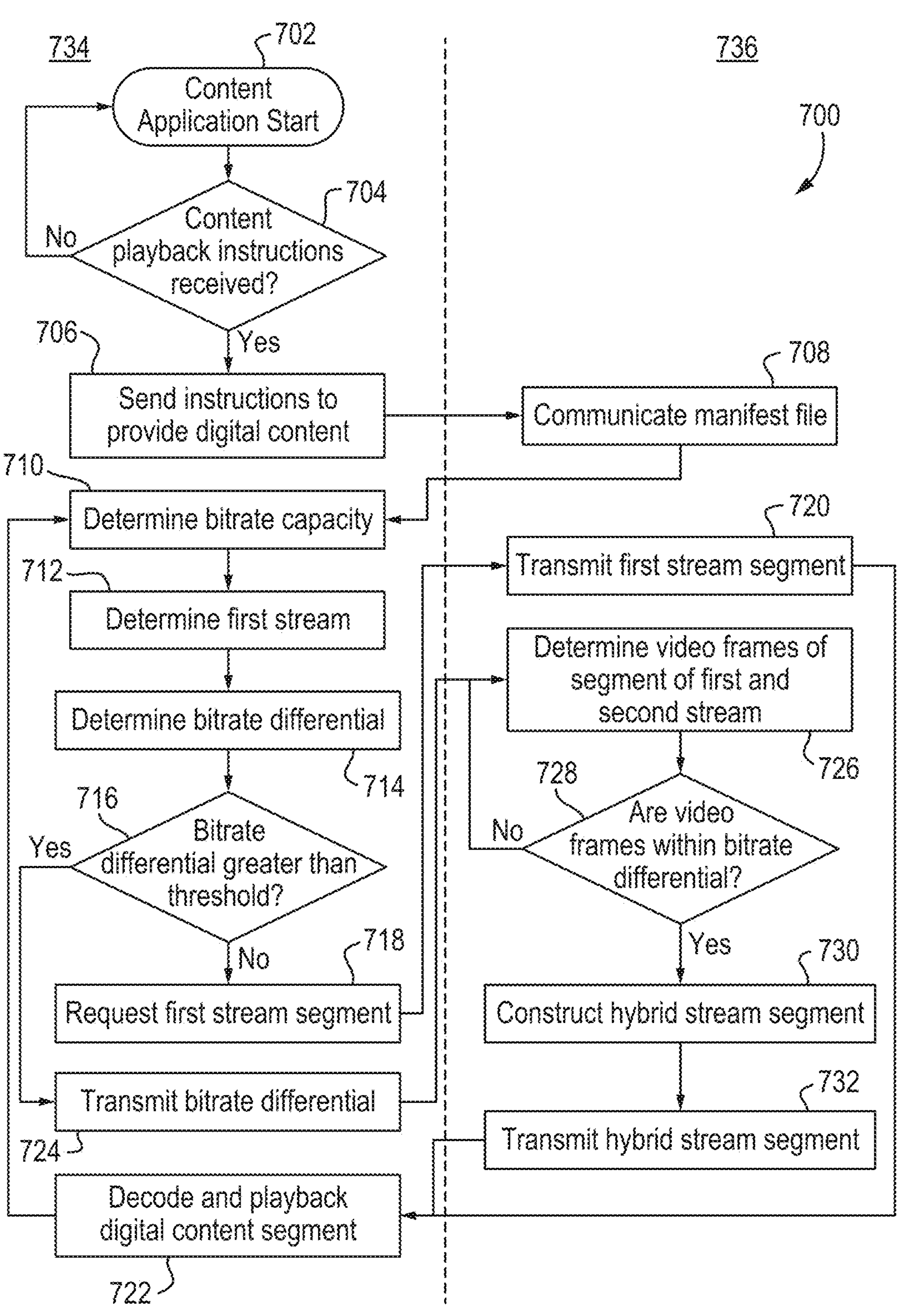
FIG. 7 depicts a flowchart representing steps of a further alternate example process to that of FIG. 2, for providing hybrid streams of digital content, in accordance with some examples of the disclosure.

FIG. 7 shows steps of a further example process 700 a further alternate example process to the example 200 of FIG. 2, for providing hybrid streams of digital content, in accordance with some examples of the present disclosure. The process 700 comprises, at 702, initiating a digital content consumption application at a device configured to, by way of the contention application, receive encoded streams of digital content for playback on the device. The device may be any suitable device configured to output digital content to a display screen, such as a smart device e.g., a smart phone or tablet, a personal computing device or laptop, or a smart television. The content application may provide one or more digital content options for selection and viewing corresponding digital content. The device may be configured to receive instructions to playback a particular digital content, for example following selection of a corresponding digital content option within the application, such as a content selection menu of the application. The application may be configured to perform a check step, at 704, to determine whether content playback instructions are received. In the event that no playback instructions are received, the application may continue to monitor for any future playback instructions. In the event that, at 702, instructions are received to playback a digital content at the device, for example following a selection of a digital content option at a content selection menu of the application, the device may be configured to, at 706, transmit instructions to a content server to provide the selected digital content to the device. The content server may be any suitable part of a content management network, and may for example be an edge server of the content management network associated with a location of the device.

Communication between the device and the content server may be performed in any suitable manner, and may for example comprise transmitting of communications by way of any intermediate devices or servers. On receiving the instructions to provide the digital content, the content server may, at 708, identify and communicate a manifest file associated with the selected digital content to the device. The manifest file may be of any suitable format such as described herein, and may define one or more streams of the selected digital content for streaming to the device, along with associated encoded parameters of each stream, for example indicating a bitrate. The manifest file may be communicated to the device alongside any suitable initialization segments of the selected digital content, for example to be used to obtain one or more network parameters such as a bitrate capacity.

On receiving the manifest file, the device may be configured to, at 710, determine one or more network parameters, such as bitrate capacity, based on the communication with the content server. Based on the determined one or more network parameters, such as a bitrate capacity, the device may be configured to determine a first stream indicated in the manifest file at 712, the first stream associated with a bitrate which is equal to or less than a bitrate capacity indicated by the one or more network parameters. The first stream may, in some examples, be associated with a highest bitrate among the plurality of streams defined in the manifest file which is equal to or lower than the bitrate capacity.

At 714, the device may be configured to determine, based on the bitrate capacity and the bitrate of the first stream, a bitrate differential. At 716, the device may be configured to compare the bitrate differential to a threshold differential, for example to determine whether sufficient surplus in bitrate capacity exists in order to accommodate further video frames of the digital content by way of transmission from the content server. In the event that the bitrate differential is zero, or is less than the predefined bitrate differential threshold, the device may be configured to, at 718, request transmission of the selected first stream from the content server. Following receipt of the request, the server may be configured to, at 720, transmit a first stream segment to the device for decoding and playback by the device at 722.

In the event that the bitrate differential is positive, or greater than the threshold differential, the device may be configured to, at 724, transmit the bitrate differential to the content server for processing. On receiving the bitrate differential, the content server may be configured to, at 726, identify a second stream of the digital content having an associated bitrate which is higher than that of the first stream, and determine a first one or more encoded video frames of the first stream and a second one or more encoded video frames of the second stream, within the constraints of the bitrate differential. For example, the content server may identify one or more encoded video frames of the second stream to supplement or replace one or more corresponding, or co-temporal encoded video frames of the first stream, wherein the identified one or more frames of the second stream when combined are associated with a bitrate which is less than the bitrate differential. Any suitable method for determining the first one or more encoded video frames of the first stream and a second one or more encoded video frames of the second stream may be envisaged, such as described herein. In some examples, the device may simply determine whether there is a positive bitrate differential before transmitting the bitrate differential to the server.

Following the determining of the first and second encoded video frames, the server may be configured to, at 728, determine whether the determined video frames are associated with a bitrate which is less than the bitrate differential. In the event that the determined frames are not within the bitrate differential, the content server may be configured to refine the determination of the video frames at 726.

In the event that the determined frames are within the bitrate differential, the content server may be configured to, at 730, construct a hybrid stream segment comprising the determined first and second encoded video frames, for transmitting, at 732, the hybrid stream to the device for decoding and playback at 722.

While the described steps of the example method 700 are shown being performed at either device-side 734 or server-side 736, it will be appreciated than equivalent steps may be performed at either the device or the server. For example, while the example 700 describes the determination of the bitrate capacity and the bitrate differential by the device, such information may be determined at the server. In some examples, while the determination of the first and second encoded video frames and construction of the hybrid stream is described as being performed at the server, the determination and hybrid stream construction may in some examples be performed device-side, or by way of an intermediate bitrate optimization server or server module.

Figure 8:
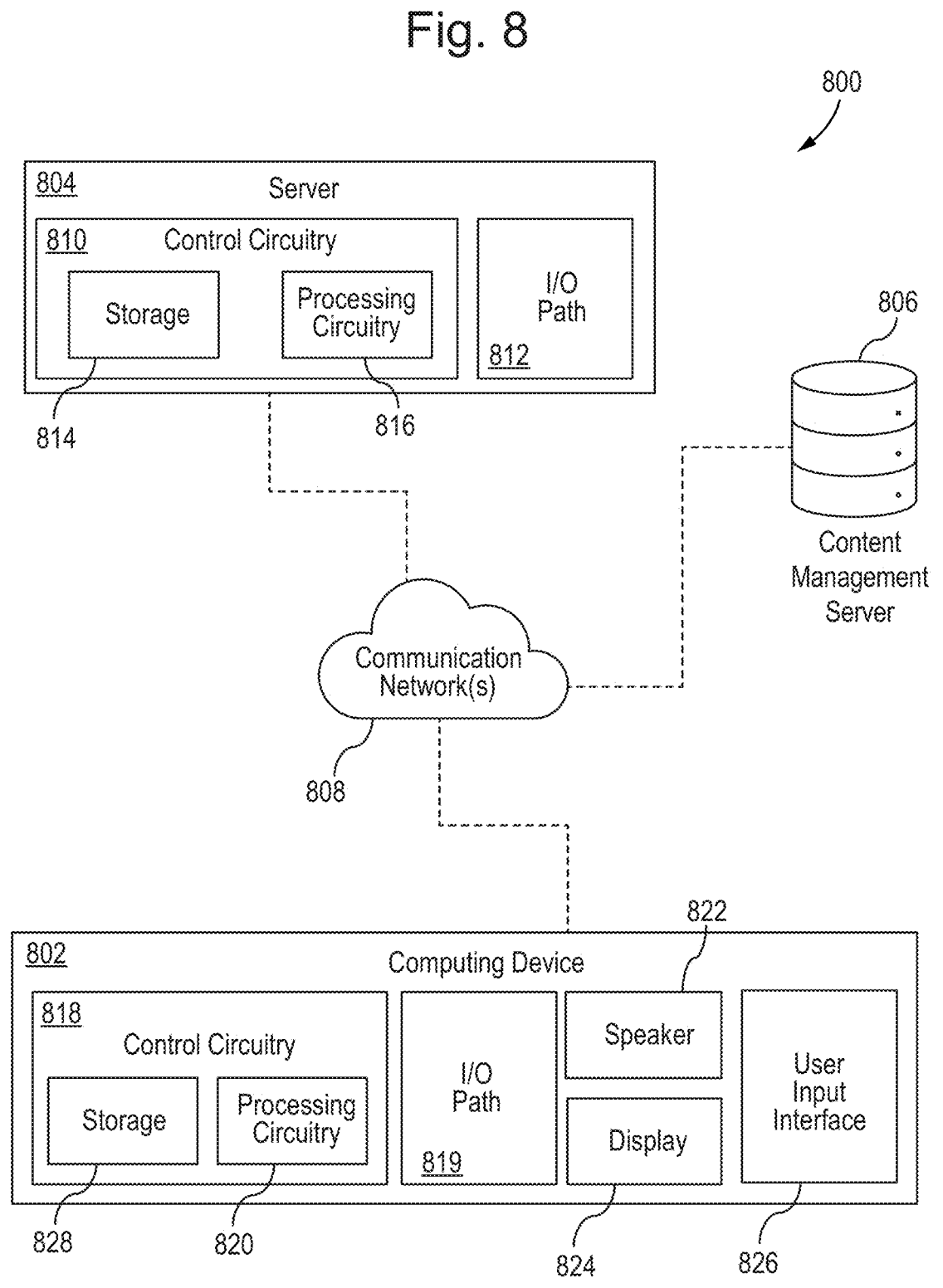

FIG. 8 is an illustrative block diagram showing example system 800 configured to provide hybrid streams of digital content. Although FIG. 8 shows system 800 as including a number and configuration of individual components, in some examples, any number of the components of system 800 may be combined and/or integrated as one device, e.g., as device 106. System 800 includes computing device 802, server 804, and content management server 806, each of which is communicatively coupled to communication network 808, which may be the Internet or any other suitable network or group of networks. In some examples, system 800 excludes servers 804, 806, and functionality that would otherwise be implemented by server 804, 806 is instead implemented by other components of system 800, such as computing device 802. In still other examples, server 804, 806 works in conjunction with computing device 802 to implement certain functionality described herein in a distributed or cooperative manner.

Server 804 includes control circuitry 810 and input/output (hereinafter "I/O") path 812, and control circuitry 810 includes storage 814 and processing circuitry 816. Computing device 802, which may be a user device such as an extended reality device for example comprising a HMD, a vehicle, a personal computer, a laptop computer, a tablet computer, a smartphone, a smart television, a smart speaker, or any other type of computing device, includes control circuitry 818, I/O path 819, speaker 822, display 824, and user input interface 826. Control circuitry 818 includes storage 828 and processing circuitry 820. Control circuitry 810 and/or 818 may be based on any suitable processing circuitry such as processing circuitry 816 and/or 820. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 814, storage 828, and/or storages of other components of system 800 (e.g., storages of server 806, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each of storage 814, storage 828, and/or storages of other components of system 800 may be used to store various types of content, metadata, and or other types of data. Non-volatile memory may also be used (e.g., to launch a boot-up routine and other instructions). Cloud-based storage may be used to supplement storages 814, 828 or instead of storages 814, 828. In some examples, control circuitry 810 and/or 818 executes instructions for an application stored in memory (e.g., storage 814 and/or 828). Specifically, control circuitry 814 and/or 828 may be instructed by an application to perform the functions discussed herein. In some implementations, any action performed by control circuitry 814 and/or 828 may be based on instructions received from an application. For example, an application may be implemented as software or a set of executable instructions that may be stored in storage 814 and/or 828 and executed by control circuitry 814 and/or 828. In some examples, the application may be a client/server application where only a client application resides on computing device 802, and a server application resides on server 804.

The application may be implemented using any suitable architecture. For example, it may be a stand-alone application wholly implemented on computing device 802. In such an approach, instructions for the application are stored locally (e.g., in storage 828), and data for use by the application is downloaded on a periodic basis (e.g., from an out-of-band feed, from an Internet resource, or using another suitable approach). Control circuitry 818 may retrieve instructions for the application from storage 828 and process the instructions to perform the functionality described herein. Based on the processed instructions, control circuitry 818 may determine what action to perform when input is received from user input interface 826.

In client/server-based examples, control circuitry 818 may include communication circuitry suitable for communicating with an application server (e.g., servers 804, 806) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 808). In another example of a client/server-based application, control circuitry 818 runs a web browser that interprets web pages provided by a remote server (e.g., server 804). For example, the remote server may store the instructions for the application in a storage device. The remote server may process the stored instructions using circuitry (e.g., control circuitry 810) and/or generate displays. Computing device 802 may receive the displays generated by the remote server and may display the content of the displays locally via display 824. This way, the processing of the instructions is performed remotely (e.g., by server 804) while the resulting displays, such as the streams described elsewhere herein, are provided locally on computing device 802. Computing device 802 may receive inputs from the user via input interface 826 and transmit those inputs to the remote server for processing and generating the corresponding displays.

A user may send instructions, e.g., to capture input data or provide input commands, to control circuitry 810 and/or 818 using user input interface 826. User input interface 826 may be any suitable user interface, such as a remote control, trackball, keypad, keyboard, touchscreen, touchpad, stylus input, joystick, voice recognition interface, gaming controller, or other user input interfaces. User input interface 826 may be integrated with or combined with display 824, which may be a monitor, a television, a liquid crystal display (LCD), an electronic ink display, or any other equipment suitable for displaying visual images.

Server 804 and computing device 802 may transmit and receive content and data via I/O path 812 and 819, respectively. For instance, I/O path 812 and/or I/O path 819 may include a communication port(s) configured to transmit and/or receive (for instance to and/or from server 806), via communication network 808, content item identifiers, content metadata, natural language queries, and/or other data. Control circuitry 810, 818 may be used to send and receive commands, requests, and other suitable data using I/O paths 812, 819.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Only the claims that follow are intended to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing hybrid streams of digital content, the method comprising:

determining one or more network parameters of a device configured to receive a hybrid stream of video frames of a digital content, the one or more network parameters comprising a bitrate capacity;

selecting, based on the one or more network parameters, a first stream from a plurality of streams of the digital content, each stream of the plurality of streams stored at a storage and associated with a corresponding one or more encoding parameters used to encode the video frames, the one or more encoding parameters indicative of a bitrate;

determining a bitrate differential between the bitrate capacity and a first bitrate of the first stream stored at a storage;

determining based on the bitrate differential: (i) a first one or more encoded video frames of the first stream stored at a storage, and (ii) a second one or more encoded video frames of a second stream of the plurality of streams stored at a storage, the second stream associated with one or more encoding parameters indicative of a second bitrate higher than the first bitrate;

constructing the hybrid stream comprising the determined first one or more encoded video frames of the first stream and the determined second one or more encoded video frames of the second stream; and providing the hybrid stream for presentation of the digital content at the device.

2. The method of claim 1, wherein the one or more encoding parameters comprises one or more selected from the group: a resolution; a frame rate; a quantization level; a group of pictures structure; a quality metric;

wherein the first stream is associated with a first encoding parameter indicative of the first bitrate, and the second stream is associated with a second encoding parameter indicative of the second bitrate higher than the first bitrate.

3. The method of claim 1, wherein at least one of the determined video frames of the second stream is an independently decodable frame.

4. The method of claim 1, further comprising:

determining, based on the bitrate differential, a threshold number of video frames of the second stream;

wherein determining the second one or more encoded video frames of a second stream is based on the threshold number.

5. The method of claim 1, wherein determining the first one or more encoded video frames of the first stream and the second one or more encoded video frames of the second stream comprises:

determining, based on the bitrate differential, a threshold temporal distance between a first video frame of the second stream and a second video frame of the second stream; and determining, based on the threshold temporal distance, the first one or more encoded video frames of the first stream and the second one or more encoded video frames of the second stream for constructing the hybrid stream.

6. The method of claim 1, wherein determining the first one or more encoded video frames of the first stream and the second one or more encoded video frames of the second stream comprises:

determining a quality metric associated with the video frames of the first stream and the video frames of the second stream;

determining a difference between the quality metric of the video frames of the first stream and the quality metric of the video frames of the second stream; and determining, based on the difference, the first one or more encoded video frames of the first stream and the second one or more encoded video frames of the second stream for constructing the hybrid stream.

7. The method of claim 1, wherein determining the first one or more encoded video frames of the first stream and the second one or more encoded video frames of the second stream comprises:

determining one or more visual characteristics of the video frames of the first stream; and determining, based on the one or more visual characteristics, the first one or more encoded video frames of the first stream and the second one or more encoded video frames of the second stream for constructing the hybrid stream.

8. The method of claim 1, wherein providing the hybrid stream comprises:

streaming the determined first one or more encoded video frames of the first stream and the second one or more encoded video frames of the second stream to the device.

9. The method of claim 1, wherein providing the hybrid stream comprises:

modifying a manifest file associated with the digital content to identify the determined first one or more encoded video frames of the first stream and the second one or more encoded video frames of the second stream.

10. A method of receiving hybrid streams of digital content, the method comprising:

determining one or more network parameters of a device configured to receive a hybrid stream of video frames of a digital content, the one or more network parameters comprising a bitrate capacity;

communicating the one or more network parameters to a server for selecting, based on the one or more network parameters, a first stream from a plurality of streams of the digital content stored at a storage of one or more server devices, each stream of the plurality of streams associated with a corresponding one or more encoding parameters used to encode the video frames, the one or more encoding parameters indicative of a bitrate;

receiving, after communicating the one or more network parameters and based on a bitrate differential between the bitrate capacity and a first bitrate of the first stream, a hybrid stream including: (i) a first one or more encoded video frames of the first stream stored at a storage; and (ii) a second one or more encoded video frames of a second stream of the plurality of streams stored at a storage, the second stream associated with one or more encoding parameters indicative of a second bitrate higher than the first bitrate; and displaying each of the received first one or more encoded video frames of the first stream and the received second one or more encoded video frames of the second stream to provide the hybrid stream of digital content.

11. A system for providing hybrid streams of digital content, the system comprising control circuitry configured to:

determine one or more network parameters of a device configured to receive a hybrid stream of video frames of a digital content, the one or more network parameters comprising a bitrate capacity;

select, based on the one or more network parameters, a first stream from a plurality of streams of the digital content, each stream of the plurality of streams stored at a storage and associated with a corresponding one or more encoding parameters used to encode the video frames, the one or more encoding parameters indicative of a bitrate;

determine a bitrate differential between the bitrate capacity and a first bitrate of the first stream stored at a storage;

determine based on the bitrate differential: (i) a first one or more encoded video frames of the first stream stored at a storage, and (ii) a second one or more encoded video frames of a second stream of the plurality of streams stored at a storage, the second stream associated with one or more encoding parameters indicative of a second bitrate higher than the first bitrate;

construct the hybrid stream comprising the determined first one or more encoded video frames of the first stream and the determined second one or more encoded video frames of the second stream; and provide the hybrid stream for presentation of the digital content at the device.

12. The system of claim 11, wherein the one or more encoding parameters comprises one or more selected from the group: a resolution; a frame rate; a quantization level; a group of pictures structure; a quality metric;

wherein the first stream is associated with a first encoding parameter indicative of the first bitrate, and the second stream is associated with a second encoding parameter indicative of the second bitrate higher than the first bitrate.

13. The system of claim 11, wherein at least one of the determined video frames of the second stream is an independently decodable frame.

14. The system of claim 11, wherein the control circuitry is further configured to:

determine, based on the bitrate differential, a threshold number of video frames of the second stream;

wherein determining the second one or more encoded video frames of a second stream is based on the threshold number.

15. The system of claim 11, wherein determining the first one or more encoded video frames of the first stream and the second one or more encoded video frames of the second stream comprises:

determining, based on the bitrate differential, a threshold temporal distance between a first video frame of the second stream and a second video frame of the second stream; and determining, based on the threshold temporal distance, the first one or more encoded video frames of the first stream and the second one or more encoded video frames of the second stream for constructing the hybrid stream.

16. The system of claim 11, wherein determining the first one or more encoded video frames of the first stream and the second one or more encoded video frames of the second stream comprises:

determining a quality metric associated with the video frames of the first stream and the video frames of the second stream;

determining a difference between the quality metric of the video frames of the first stream and the quality metric of the video frames of the second stream; and determining, based on the difference, the first one or more encoded video frames of the first stream and the second one or more encoded video frames of the second stream for constructing the hybrid stream.

17. The system of claim 11, wherein determining the first one or more encoded video frames of the first stream and the second one or more encoded video frames of the second stream comprises:

determining one or more visual characteristics of the video frames of the first stream; and determining, based on the one or more visual characteristics, the first one or more encoded video frames of the first stream and the second one or more encoded video frames of the second stream for constructing the hybrid stream.

18. The system of claim 11, wherein providing the hybrid stream comprises:

streaming the determined first one or more encoded video frames of the first stream and the second one or more encoded video frames of the second stream to the device.

19. The system of claim 11, wherein providing the hybrid stream comprises:

modifying a manifest file associated with the digital content to identify the determined first one or more encoded video frames of the first stream and the second one or more encoded video frames of the second stream.

* * * * *